(12) United States Patent
Chao et al.

(10) Patent No.: US 8,210,714 B2
(45) Date of Patent: Jul. 3, 2012

(54) ILLUMINANT MODULE WITH OPTICAL FILM OF MULTIPLE CURVATURES

(75) Inventors: Chih-Chiang Chao, Taipei (TW);
Po-Ling Shiao, Hsinchu (TW); Yu-Tsan Tseng, Taoyuan County (TW);
Mei-Chun Lai, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 89 days.

(21) Appl. No.: 12/353,945

(22) Filed: Jan. 14, 2009

(65) Prior Publication Data

US 2010/0053954 A1    Mar. 4, 2010

(30) Foreign Application Priority Data

Aug. 28, 2008 (TW) ................. 97132889 A

(51) Int. Cl.
*F21V 5/04* (2006.01)
*G02B 27/12* (2006.01)

(52) U.S. Cl. .............. 362/235; 362/311.02; 362/311.09; 362/311.1; 362/336; 359/619

(58) Field of Classification Search .................. 362/235, 362/236, 244, 311.09, 311.1, 330, 336–340, 362/311.02; 359/619, 624, 626, 831, 837, 359/455
See application file for complete search history.

(56) References Cited

U.S. PATENT DOCUMENTS

| | | | | |
|---|---|---|---|---|
| 1,071,900 A | * | 9/1913 | Edison | 362/235 |
| 1,948,555 A | * | 2/1934 | Wood | 362/334 |
| 3,764,800 A | * | 10/1973 | Clostermann | 362/330 |
| 4,080,529 A | * | 3/1978 | Nagel | 362/235 |
| 5,515,253 A | * | 5/1996 | Sjobom | 362/244 |
| 5,552,907 A | * | 9/1996 | Yokota et al. | 349/62 |
| 5,584,556 A | * | 12/1996 | Yokoyama et al. | 362/625 |
| 5,632,551 A | * | 5/1997 | Roney et al. | 362/485 |
| 5,833,355 A | * | 11/1998 | You et al. | 362/244 |
| 5,861,990 A | * | 1/1999 | Tedesco | 359/599 |
| 6,147,732 A | * | 11/2000 | Aoyama et al. | 349/112 |
| 6,505,959 B2 | * | 1/2003 | Masaki et al. | 362/339 |
| 6,550,941 B1 | * | 4/2003 | Keuper et al. | 362/337 |
| 6,666,569 B2 | * | 12/2003 | Obata | 362/339 |
| 7,054,068 B2 | * | 5/2006 | Yoshida et al. | 359/624 |
| 7,532,406 B2 | * | 5/2009 | Hill et al. | 359/623 |
| 7,777,831 B2 | * | 8/2010 | Kim et al. | 349/62 |
| 2005/0264716 A1 | | 12/2005 | Kim et al. | |
| 2005/0265029 A1 | | 12/2005 | Epstein et al. | |
| 2008/0231780 A1 | * | 9/2008 | Graf et al. | 349/112 |

FOREIGN PATENT DOCUMENTS

CN 101153924 4/2008
JP 2002-049326 2/2002
(Continued)

OTHER PUBLICATIONS

China Patent Office, Office Action, Patent Application No. 200810211425.1, Jun. 15, 2011, China.

*Primary Examiner* — Alan Cariaso

(57) ABSTRACT

An Illuminant module includes an optical film and a light source array. The optical array includes a plurality of concave surfaces and a plurality of convex surfaces alternatively arranged along at least one direction, wherein each concave surface has a concave surface width along the at least one direction, and each convex surface has a convex surface width along the at least one direction. The light source array includes a plurality of light emitting diodes, wherein the concave surface width is not equal to the convex surface width, and the light from the light source array penetrates the optical film.

12 Claims, 17 Drawing Sheets

FOREIGN PATENT DOCUMENTS

| | | |
|---|---|---|
| JP | 2005285697 | 10/2005 |
| TW | 200712563 | 4/2007 |
| WO | WO 2005/041632 A2 | 5/2005 |
| WO | WO 2007/050274 A1 | 5/2007 |

* cited by examiner

ILLUMINANT MODULE WITH OPTICAL FILM OF MULTIPLE CURVATURES

CROSS REFERENCE TO RELATED APPLICATIONS

This Application claims priority of Taiwan Patent Application No. 097132889, field on Nov. 11, 2008, the entirety of which is incorporated by reference herein.

BACKGROUND OF THE INVENTION

1. Field of the Invention

The invention relates to an illuminant module, and more particularly, an illuminant module comprising an optical film with alternatively arranged specific concave surfaces and convex surfaces to diffuse light from light emitting diodes.

2. Description of the Related Art

As light emitting diodes (LEDs) have high efficiency, they are gradually being more frequently applied to illumination products. When brightness in increased, the light intensity from a single spot is increased. High brightness LEDs have a dazzle problem, which is uncomfortable for human eyes. Because an LED has directional properties, brightness is concentrated on central portions, which is not suitable for illumination. Although the efficiency of a single LED can exceed 80 lm/W, the luminous flux of a single LED for ordinary illumination cannot exceed 500 lm, thus practically, more than one LED must be used for illumination. The combination of more than one LED may cause multiple shadows, which, if applied in a reading situation, influences reading. A conventional technique for solving the multiple shadow problem is to group a plurality of LEDs together or install a diffusion plate. However, for the grouping of a plurality of LEDs technique, a heat dissipation problem may occur and the dazzle problem may worsen. As for the diffusion plate technique, luminous flux may be reduced, and because the number of LEDs must be increased, the heat dissipation problem may worsen. In addition to the diffusion plate, a diffusion film with high haze is often used. However, the diffusion film cannot diffuse the high intensity light of LEDs.

For an illumination device, unlike a backlight module, a simple structure is often needed, such as a single-plated structure, and high efficiency. An illumination device using LEDs often has a secondary optical deign to uniform brightness. However, some optical designs combined with the LEDs, such as an optical cap, may increase manufacturing cost and complicate the manufacturing process. Additionally, other optical designs utilizing mirror or micro lenses, which may result in more precise positioning and excellent optical diffusion and alignment focus, have higher costs. Meanwhile, while a single-typed micro lens can provide a local refraction optical path and secondary reflection, it cannot uniform the light beam from a highly luminous light source.

US patent publication No. 20050264716 discloses an LED light source comprising a column lens, a micro lens array and an LED. A large mirror is directly disposed on an LED substrate. The LED array is aligned with the tip of the micro mirror array, whereby the light beam is refracted at the tip to the diffusion dots on the micro lens array. The refracted light beam is mixed with light beams from the LEDs. However, for such a structure, when the alignment is poor, light beam is not refracted to the diffusion dots, thus there is no light mixing effect. Also, the temperature of the micro mirrors and the LED is increased by the refraction between the mirror and the substrate.

US patent publication No. 20050265029 discloses stacks of LED substrates, reflective layers and optical layers. The thicknesses and gaps of the reflective layer are controlled to obtain better optical efficiency. In such a structure, optical alignment is required.

The World patent No. WO2007050274 utilizes two secondary optical elements to diffuse short distance light beams, thereby diffusing LED light spots. A micro lens is disposed above the LED to control the incident angle to generate uniform light beams. The uniform light beam is mixed by a diffusion film. However, such a structure still needs optical alignment. Additionally, the alignment of the micro lens and the mirror is complicated, and the optical diffusion is limited by the size of the mirror.

Japan patent publication No. 2005285697 discloses an illuminant module comprising an LED array and a micro mirror array. The LED array has a size deviation when compared with the micro mirror array. The center of the LED array is located in the focus area of the micro mirror. LEDs on the outer region have a position shift with the micro mirrors of the micro mirror array. The diffused light beam can be concentrated on a specific region to increase brightness. However, such a structure limits illumination range.

Japan patent publication No. 200249326A discloses a combined micro lens array and LED array. However, the structure also needs optical alignment. Also, optical diffusion is also limited.

World patent publication No. 2005041632A2 utilizes two secondary optical element for secondary optical refraction and diffusion. The structure uses a micro lens for secondary optical diffusion rather than the mirror in the previous patents.

The described patents need alignment of the micro mirror array and the LED array to diffuse the light from an LEDs and control brightness. Thus, the structures and alignment needed disclosed in the described patents are complicated.

BRIEF SUMMARY OF INVENTION

An embodiment of an illuminant module of the invention comprises an optical film and a light source array. The optical array comprises a plurality of specific concave surfaces and a plurality of convex surfaces alternatively arranged along at least one direction, wherein each concave surface has a concave surface width along the at least one direction, and each convex surface has a convex surface width along the at least one direction. The light source array comprises a plurality of light emitting diodes, wherein the concave surface width is not equal to the convex surface width, and the light from the light source array penetrates the optical film.

The concave surface has a maximum depth perpendicular to the at least one direction, and the convex surface has a maximum height perpendicular to the at least one direction. The maximum depth is larger than ½ the concave surface width, and the height is larger than ½ the convex surface width.

The concave surfaces and the convex surfaces are alternatively arranged along a first direction and a second direction. The first direction is perpendicular to the second direction. The conjunction of concave surfaces and convex surface is continuous but not smooth. The term "smooth" means the differentiation of the profile function is continuous in the junction of the concave and convex surface.

The concave surface width and the convex surface width are gradually larger along the at least one direction. The concave surface has a maximum depth perpendicular to the at least one direction, and the convex surface has a maximum height perpendicular to the at least one direction. The maximum depth and the maximum height gradual increase or decrease along the at least one direction.

The ratio of the distance from the light emitting diode to the optical film over the gap of the light emitting diodes is less than 5.

The distance of each light emitting diode to the optical film can be equal or not equal.

A detailed description is given in the following embodiments with reference to the accompanying drawings.

BRIEF DESCRIPTION OF DRAWINGS

The present invention can be more fully understood by reading the subsequent detailed description and examples with references made to the accompanying drawings, wherein.

DETAILED DESCRIPTION OF INVENTION

The invention utilizes a micro lens array formed by discontinuously conjunctional concave lenses and convex lenses with high depth-width ratio and different curvatures, wherein incident light is propagated along the optical film. Such a light transmission technique comprises diffusion, secondary reflection, secondary refraction and propagation in media with total reflection. A planar light source is generated from point light sources by adjusting the gap between LEDs. The planar light source has the same efficiency and brightness as the point light source.

Figure 1:
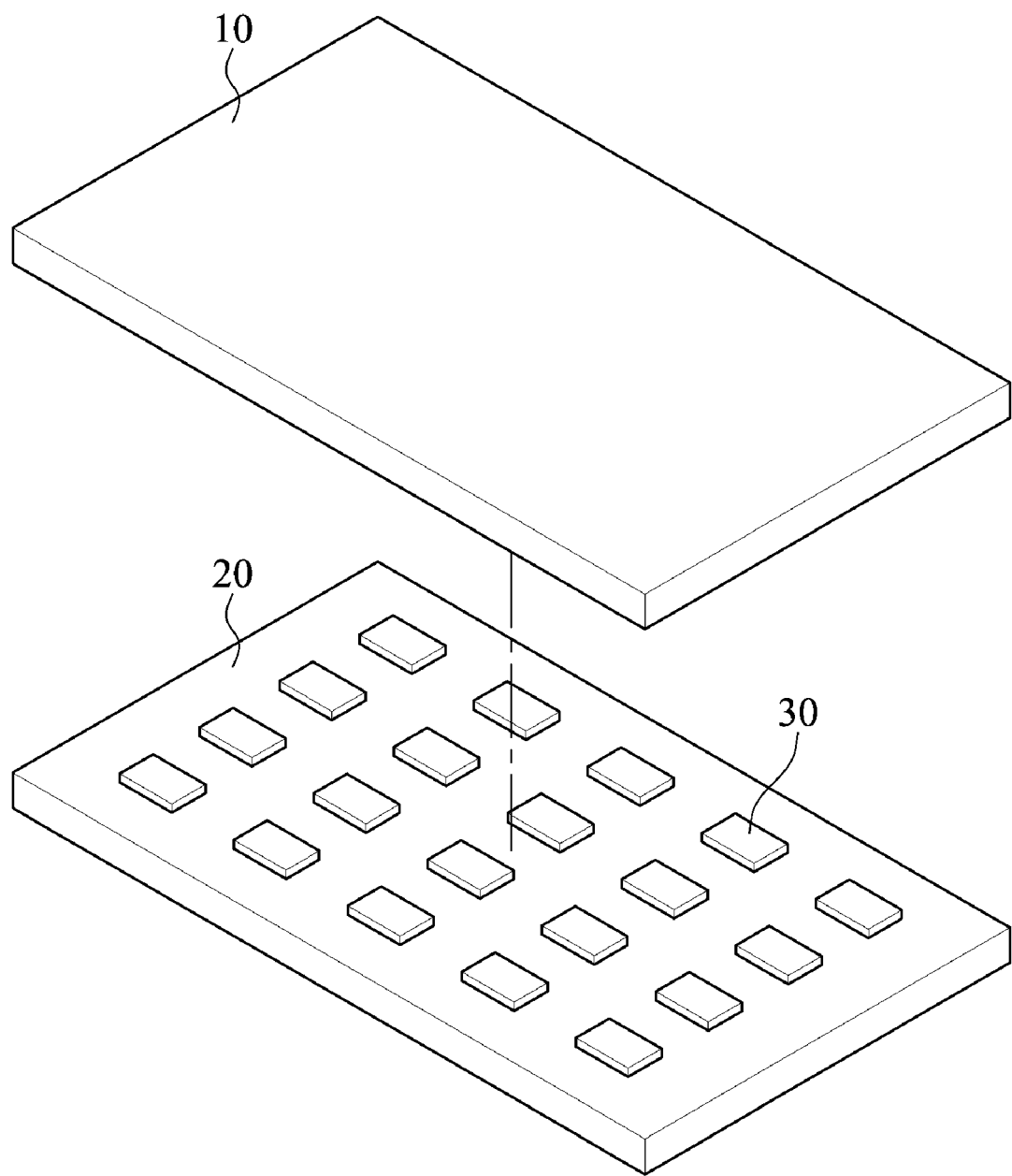
FIG. 1 is a schematic view of an illuminant module of the invention.

Referring to FIG. 1, an illuminant module of the invention comprises an optical film 10, a substrate 20 and a plurality of LEDs 30 disposed on the substrate 20. The LEDs 30 are arranged as a two dimensional array.

In this embodiment, the material of the optical film is poly carbonate (PC) having refraction rate of 1.59.

An optical path in an optical film comprising convex surfaces and concave surfaces is described before the embodiment of the invention is described.

Figure 2:
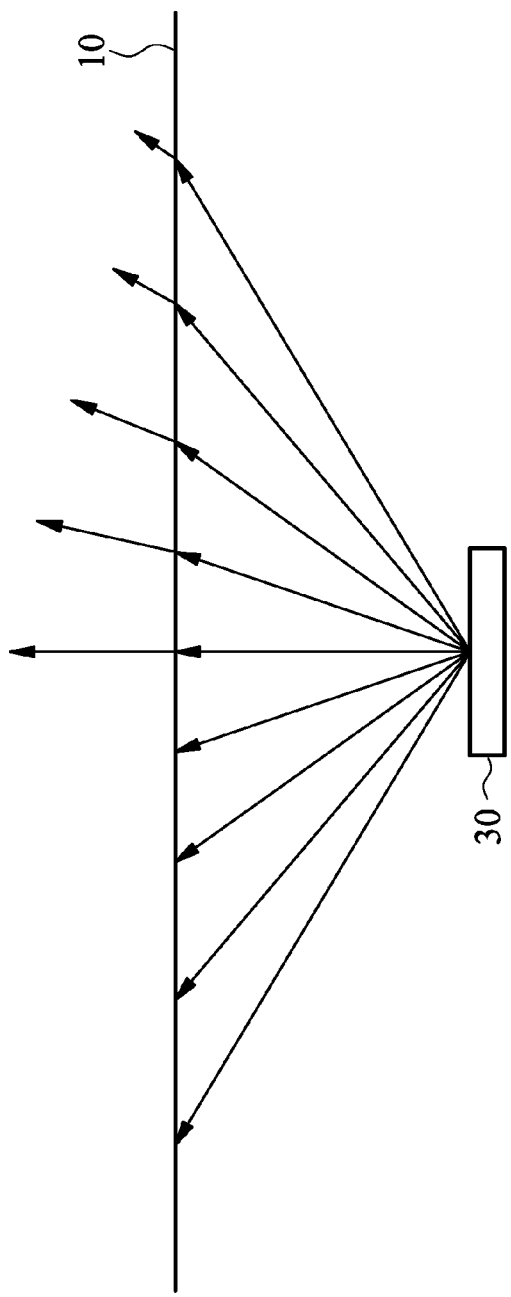
FIG. 2 is a schematic view showing light from an LED entering an optical film.

Referring to FIG. 2, light from the LED 30 enters the optical film 10 with different incident angles. The field angle of the light beam in FIG. 2 is 120°. The length of the arrow in the optical film 10 represents the intensity of light. The light intensity depends on the incident angle, and the maximum intensity is obtained at the incident angle of 90° (shown ahead of the LED).

Figure 3:
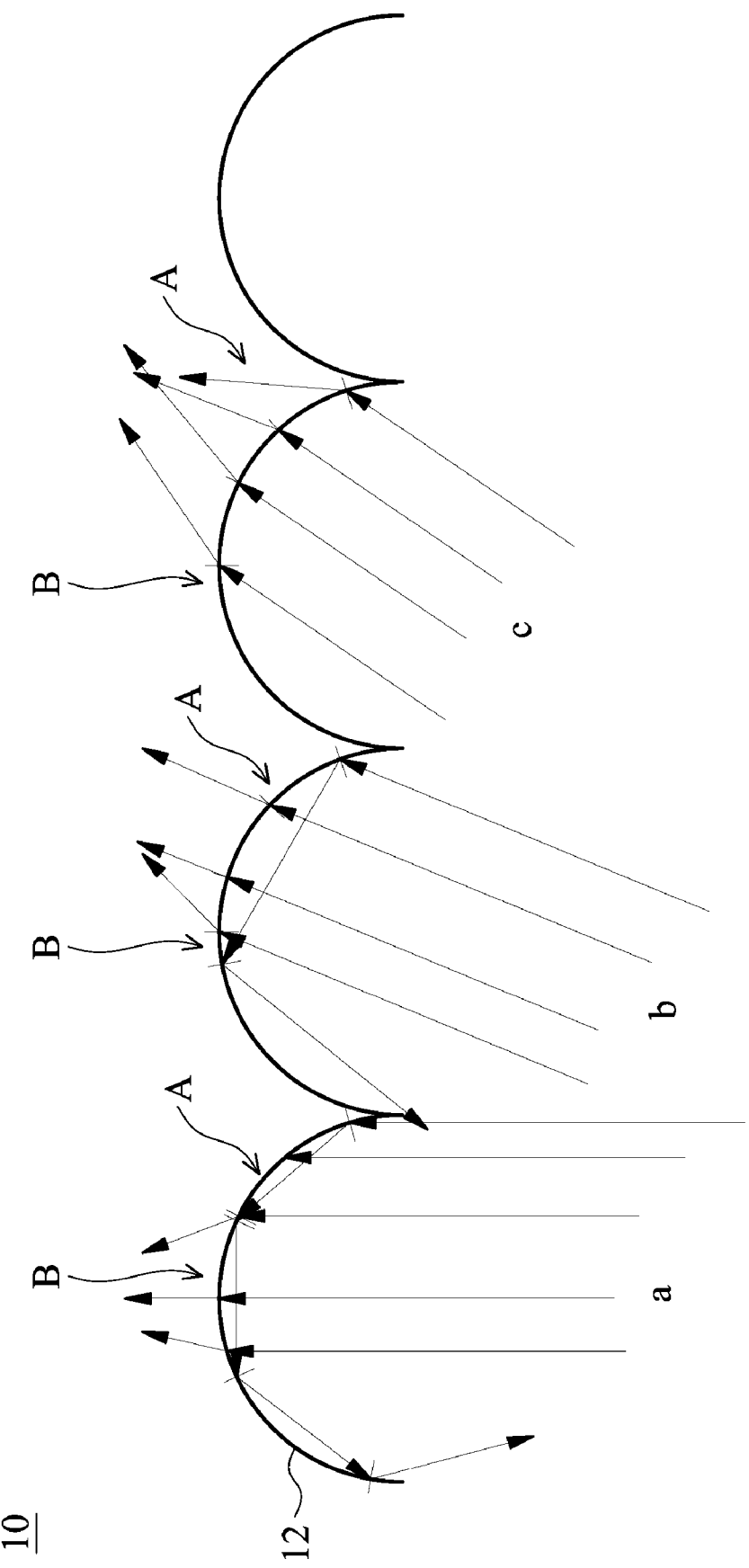
FIG. 3 depicts an optical film formed by closely arranged convex surfaces.

FIG. 3 depicts the optical film comprising a micro lens array formed by closely arranged convex surfaces 12. Light beams of three incident angles (30°, 60° and 90° shown by arrow c, b and a, respectively) are described. The convex surface 12 is a part of a semi-sphere. When the light enters the optical film 10 by an incident angle of 90°, most light beams leave the optical film 10 at portion B. The light beams passing through the portion A is secondary refracted. When incident angle of the light beam is 30° or 60°, light beams leave the optical film 10 at both the portions A and B. In such an optical behavior, secondary refraction occurs when the light beams have a large incident angle, and light beams partially leave the optical film when the light beams have a small incident angle.

Figure 4:
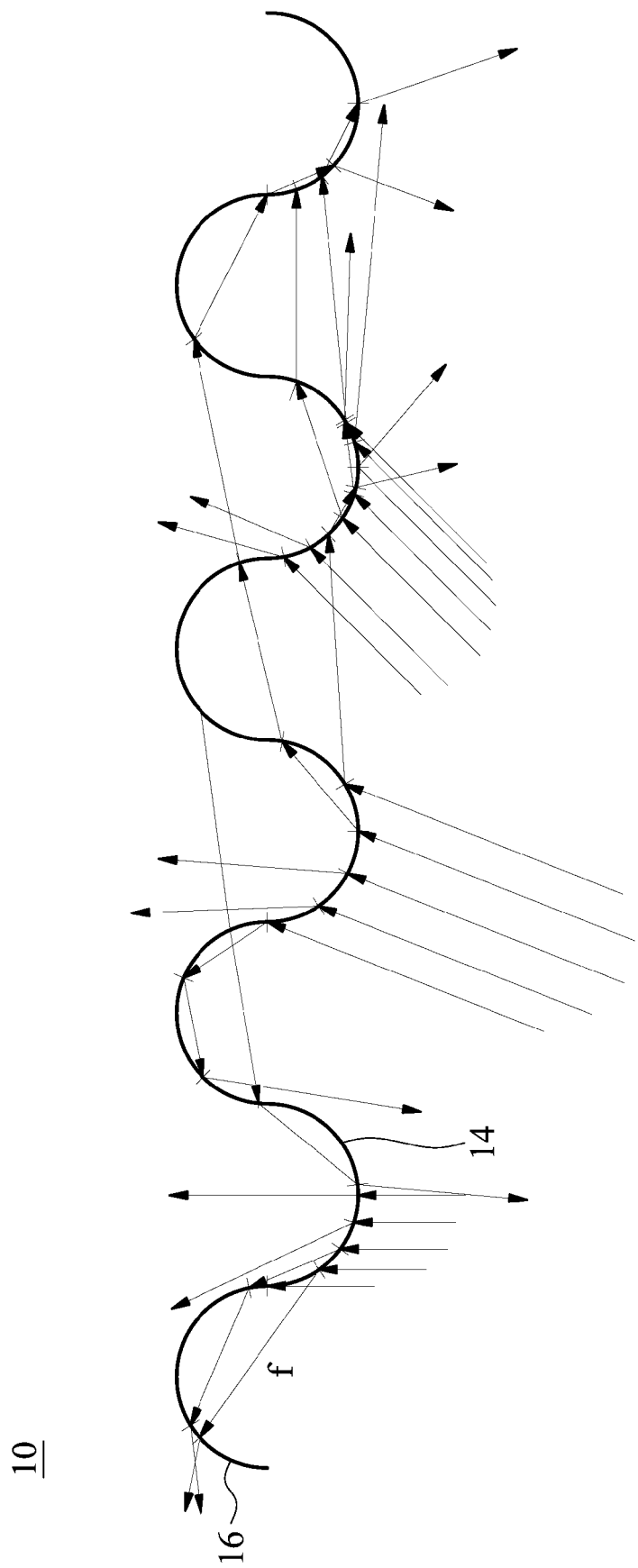
FIG. 4 depicts an optical film formed by an alternatively arranged concave lens and convex lens of a semi-spherical shape.

FIG. 4 depicts an optical film 10 comprising semi-spherical concave lenses 14 and convex lenses 16 alternatively arranged (Like sine wave function etc.). In addition to the optical path in the convex lens 16 as described in FIG. 3, a new optical path is formed in the concave lens 14 adjacent to the convex lens 16. The light beams traverse the junction of the concave lens 14 and the convex lens 16 to propagate parallel to the optical film, as shown by arrow f. In such a structure, light beams can travel a longer path than FIG. 3 and leave the optical film 10 at the concave lens 14 or convex lens 16 by an appropriate angle. As the concave lens 14 has the same size as the convex lens 16, light beams leaving the optical film 10 structure can be twice of those leaving a structure comprising only concave lenses or convex lenses. Specifically, most light beams leave the optical film, and only a few light beams traverse the junction of the concave lens 14 and the convex lens 16 to propagate parallel to the optical film. Thus, light beam diffusion is hindered.

Figure 5:
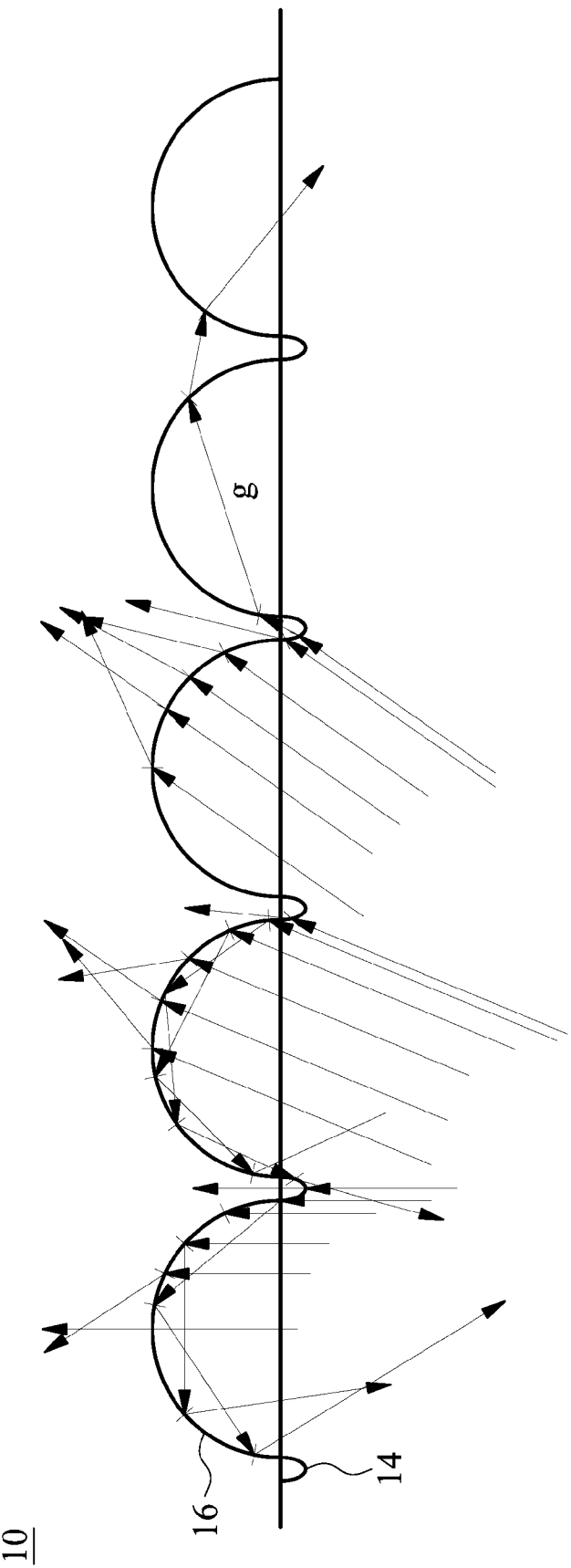
FIG. 5 is a cross section of an embodiment of an optical film of the invention.

The embodiment of the invention of an illuminant module is shown in FIG. 5. The width of the concave lens 14 is smaller than that in FIG. 4, i.e. the width of the concave lens 14 is not equal to the width of the convex lens 16. In such a structure, most of the light beams entering the concave lens 14 traverse the junction of the concave lens 14 and the convex lens 16 to propagate parallel to the optical film 10, as shown in FIG. 5.

Figure 6:
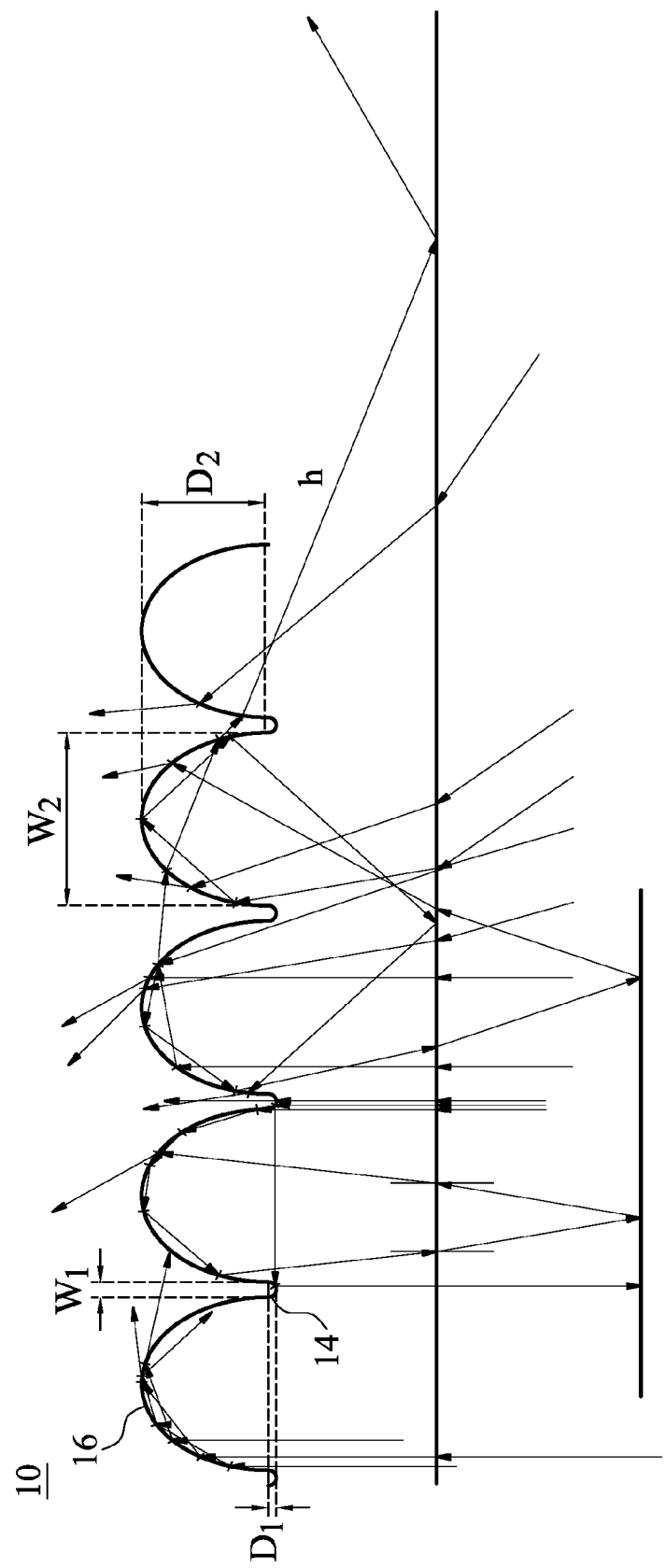
FIG. 6 is a cross section of another embodiment of an optical film of the invention.

FIG. 6 depicts another embodiment of an optical film. The ratio of depth over width of a concave lens or a convex lens is increased. In such a structure, the amount of traversing light beams (arrow h) are much more than in the embodiment in FIG. 5. As shown in FIG. 6, the concave surface 14 has a maximum depth D1 perpendicular to the at least one direction, and the convex surface 16 has a maximum height D2 perpendicular to the at least one direction, and the maximum depth D1 is larger than ½ the concave surface width W1, and the height D2 is larger than ½ the convex surface width W2.

Figure 7:
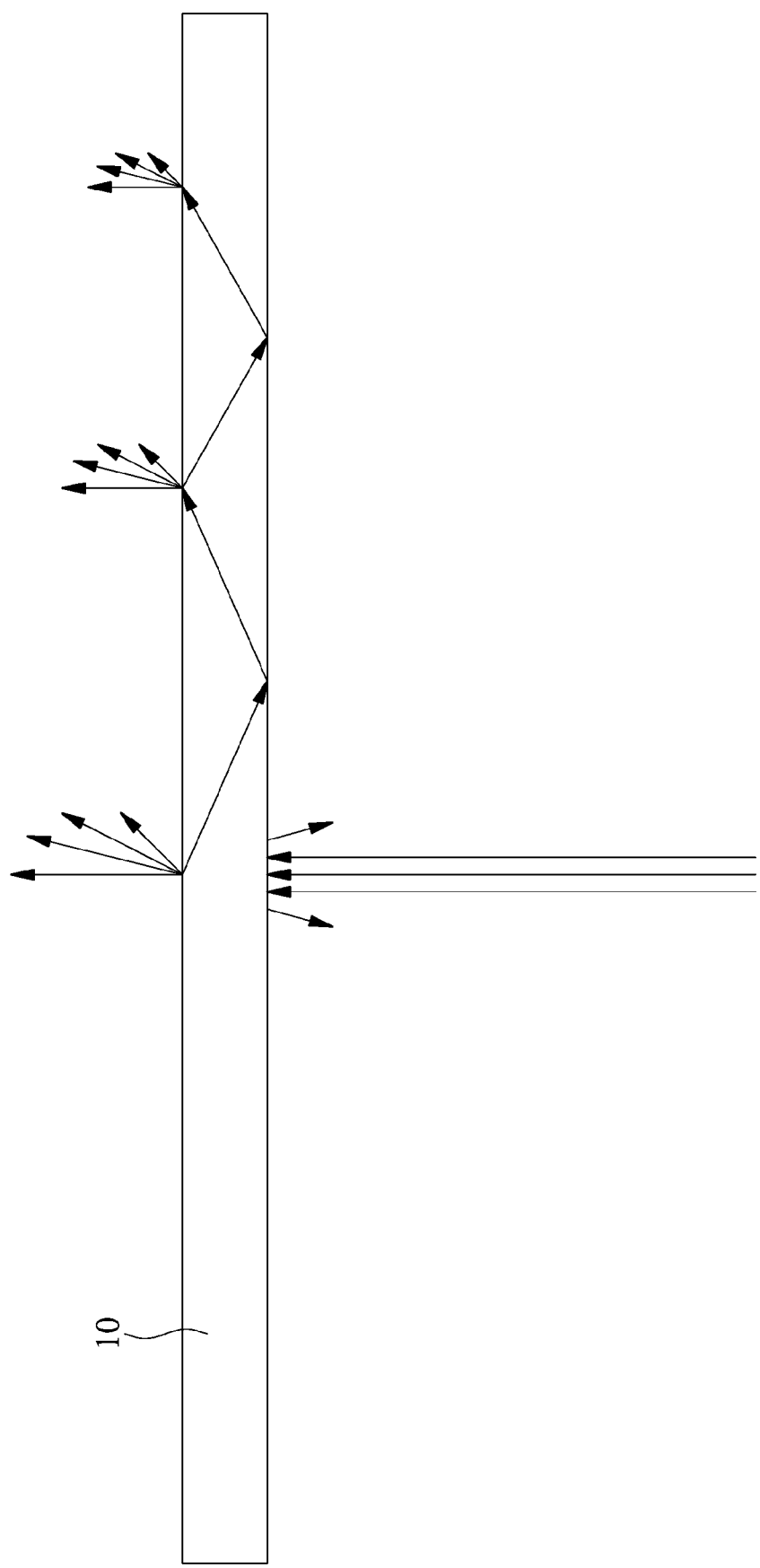
FIG. 7 depicts the optical path of the optical films in FIGS. 5 and 6.
Figure 8:
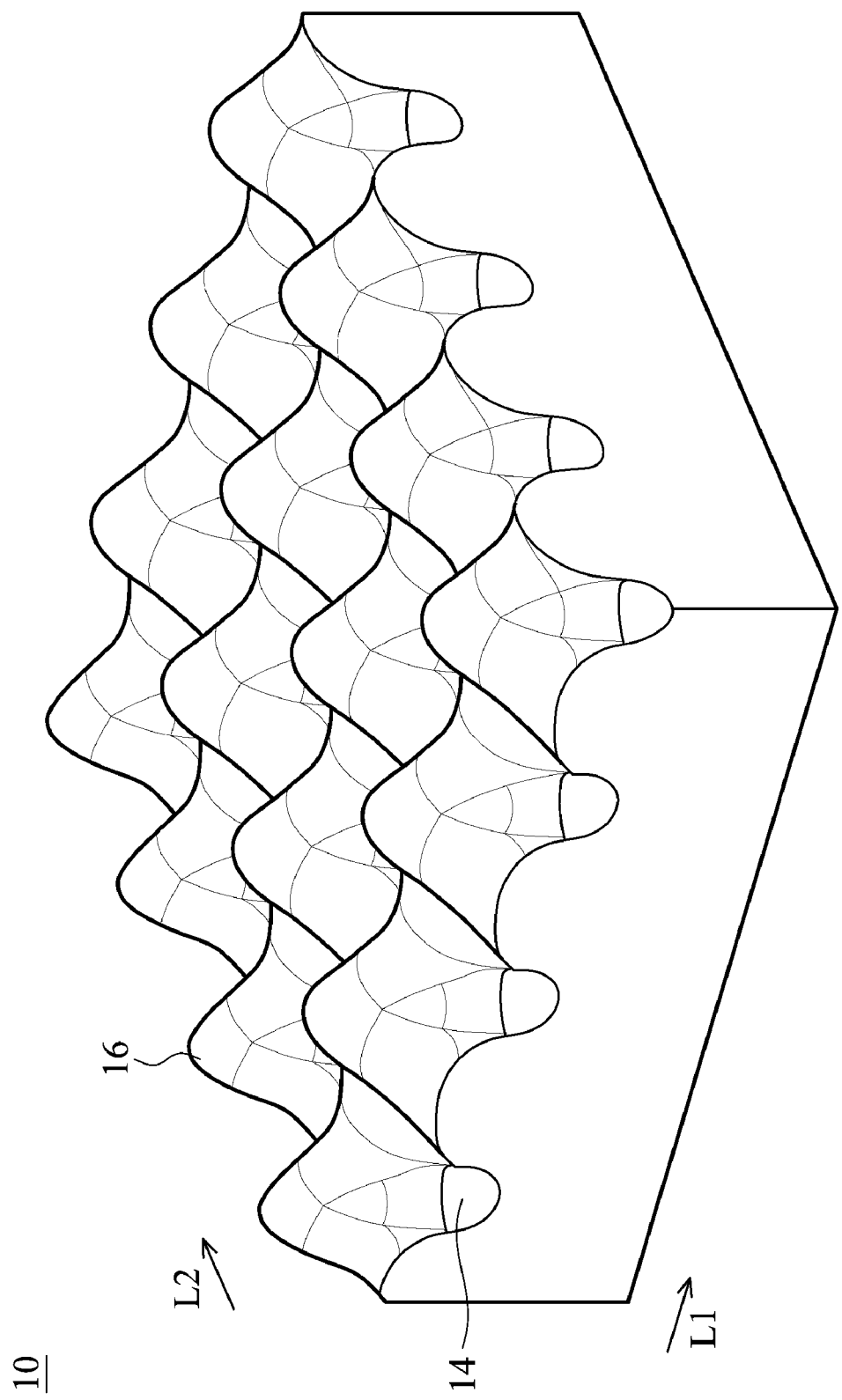
FIG. 8 is a perspective view of an optical film of the invention.

FIG. 7 depicts the optical path in the optical film in FIGS. 5 and 6. For the sake of clarity, the structure of the optical film 10 is simplified. Light beams from an LED 30 enter the optical film 10, travel in the optical film in a direction parallel to the optical film 10, and leave the optical film 10 in a position at an appropriate distance from the incident point. As the light source comprises an LED array, the light beams from each LED 30 can leave the optical film 10 at many points, whereby light concentration is avoided, and the dazzle problem and shadow problem can be mitigated. The optical film can be manufactured by laser dragging and photo masks to form a micro lens array of high ratio of depth over width, as shown in FIG. 8. The concave lenses (concave surfaces) 14 and the convex lenses (convex surfaces) 16 are alternatively arranged along a first direction L1 and a second direction L2. The structure can have a micro lens of low depth-width ratio between two micro lenses of high depth-width ratio.

Test for enlargement ratio and optical efficiency:

Table 1 shows the enlargement of a light beam, wherein WD represents the type of LED array, FD represents the optical film of the invention, and GD represents a conventional diffusion film. The enlargement ratio of the optical film of the invention ranges from 67 to 1012.

Table 2 shows the optical efficiency which is measured by a power meter. The optical efficiency of the optical film of the invention is 89%, which is very close to the optical efficiency of the conventional diffusion film, which is 90.7%, but much higher than the optical efficiency of the diffusion plate, which is 75.1%. In addition to good enlargement ratio, the optical film of the invention has excellent optical efficiency.

Figure 9:
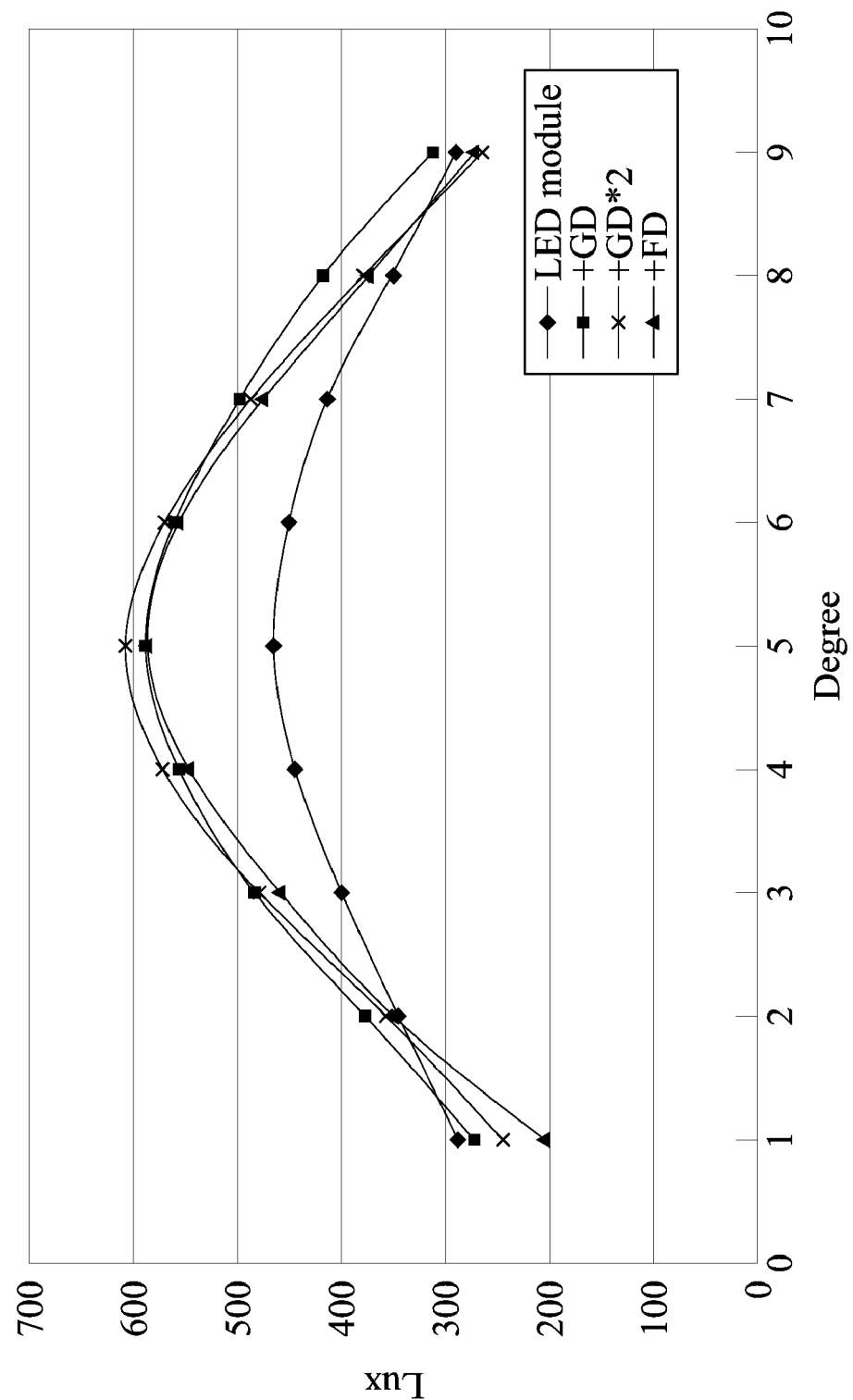
FIGS. 9 to 11 depict the brightness curves of three types of LEDs in Table 3.
Figure 10:
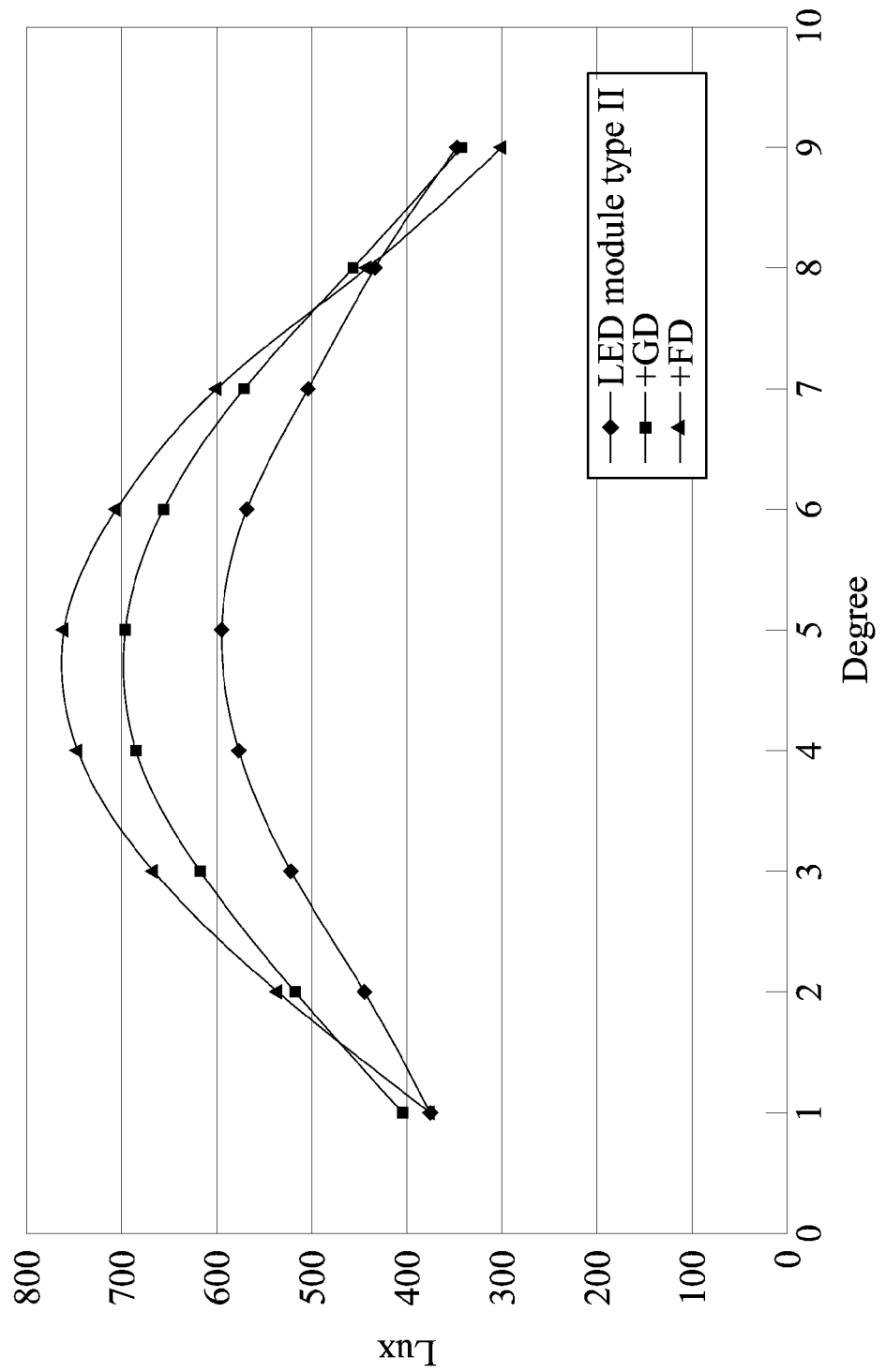
Figure 11:
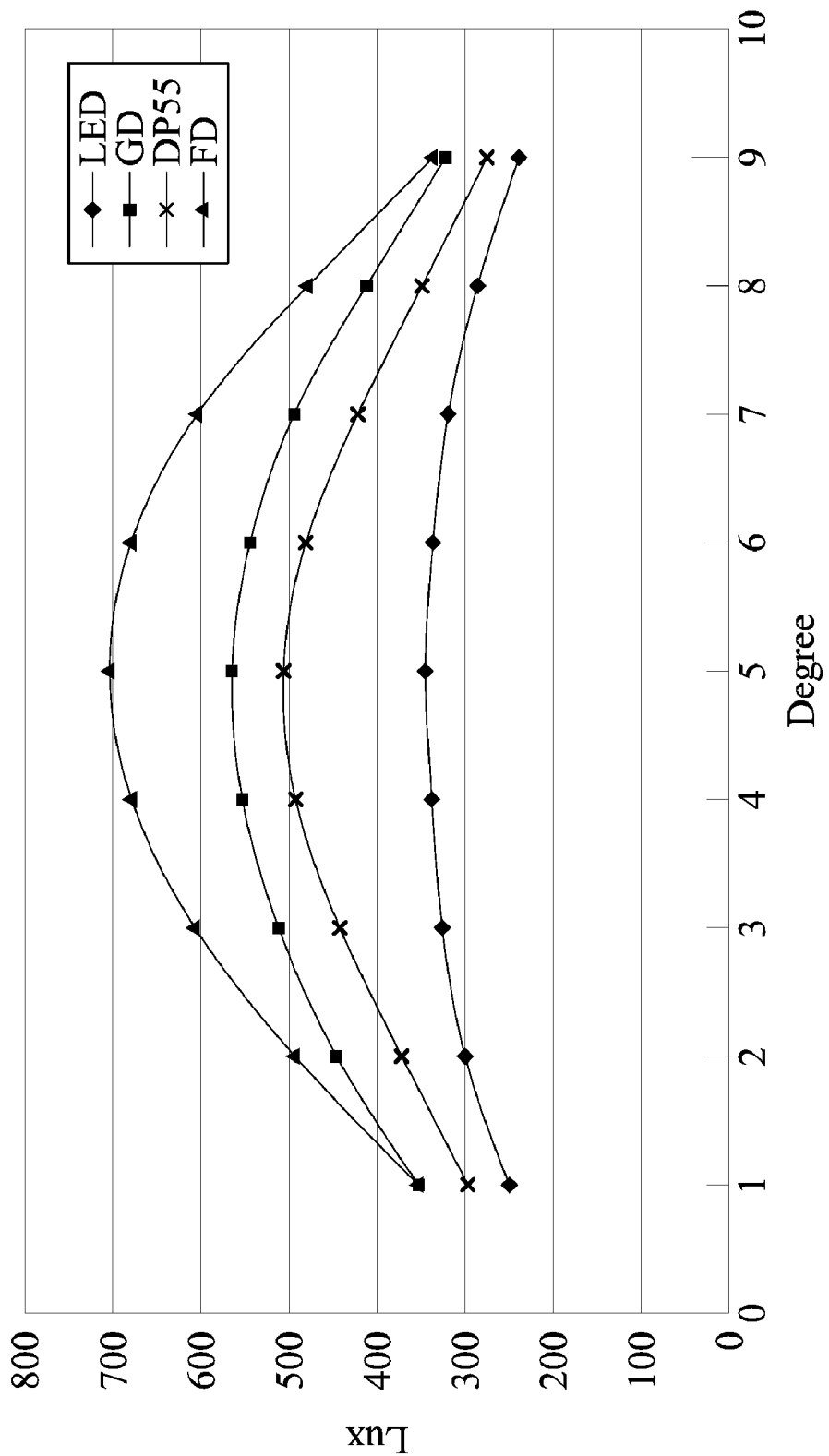
Figure 17:
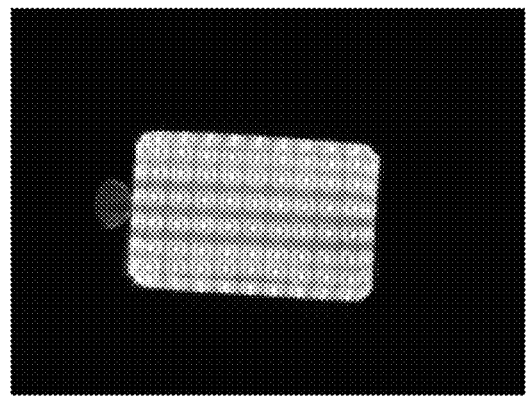
FIGS. 17-19 show the curve of brightness versus CCD image of the Type III LED in Table 3.
Figure 18:
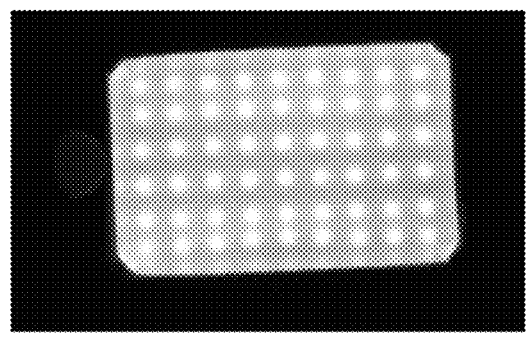
Figure 19:
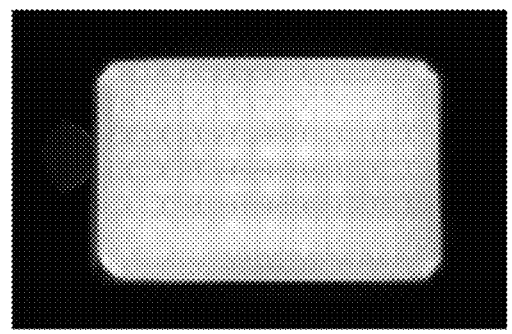

Table 3 shows the brightness of the optical film tested by an LED array of low power. According to the space ratio of the LED array (the ratio of the distance from LEDs to the optical film over the gap of the LEDs), there are three types of LEDs. FIGS. 17-19 show the LED array Type III with different optical films. FIG. 17 shows an LED array without an optical film, FIG. 18 shows an LED array with a conventional diffusion film, and FIG. 19 shows an LED array with the optical film of the invention. FIGS. 9 to 11 show the light distribution of the three types of optical film include diffuser sheet double diffuser sheet and optic film of this invention with same LED module. Table 3 shows the gain of the three types of LEDs. Different space ratios cause different brightness curves. The central gain of the Type III LED reached 200%, compared with the central of the LED with no optical film. The optical film can uniform light from point light sources and increase brightness.

Figure 12:
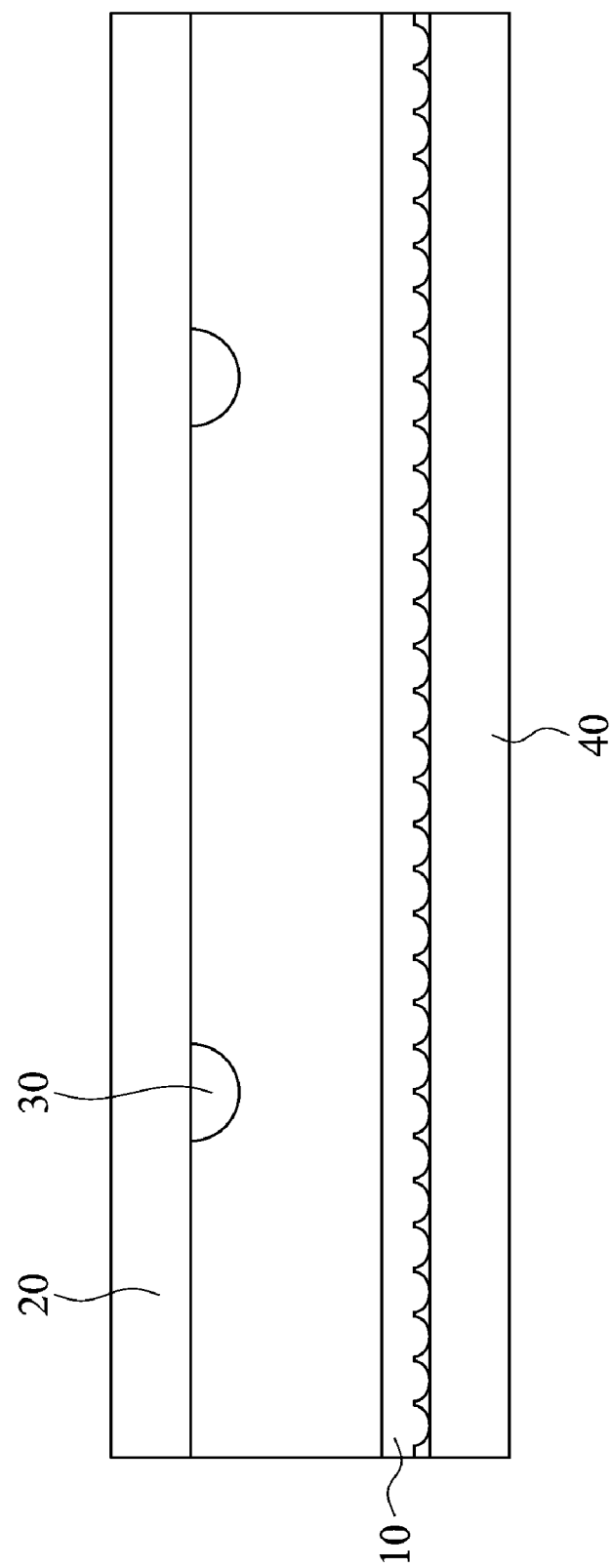
FIG. 12 depicts a test device for a high power LED array.
Figure 20:
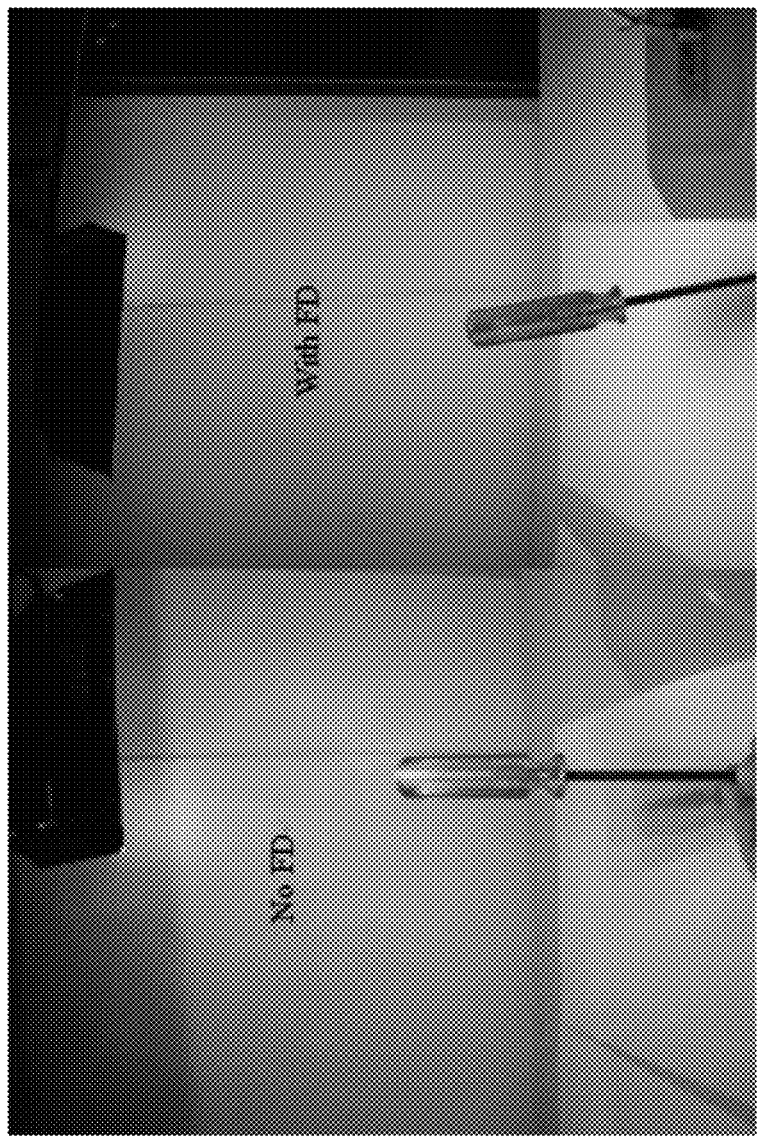
FIG. 20 shows the optical film of the invention eliminating light spots.

FIG. 12 shows a test device for a high power LED array comprising an acrylic plate 40. FIG. 20 shows the optical film of the invention eliminating shadows.

Figure 13:
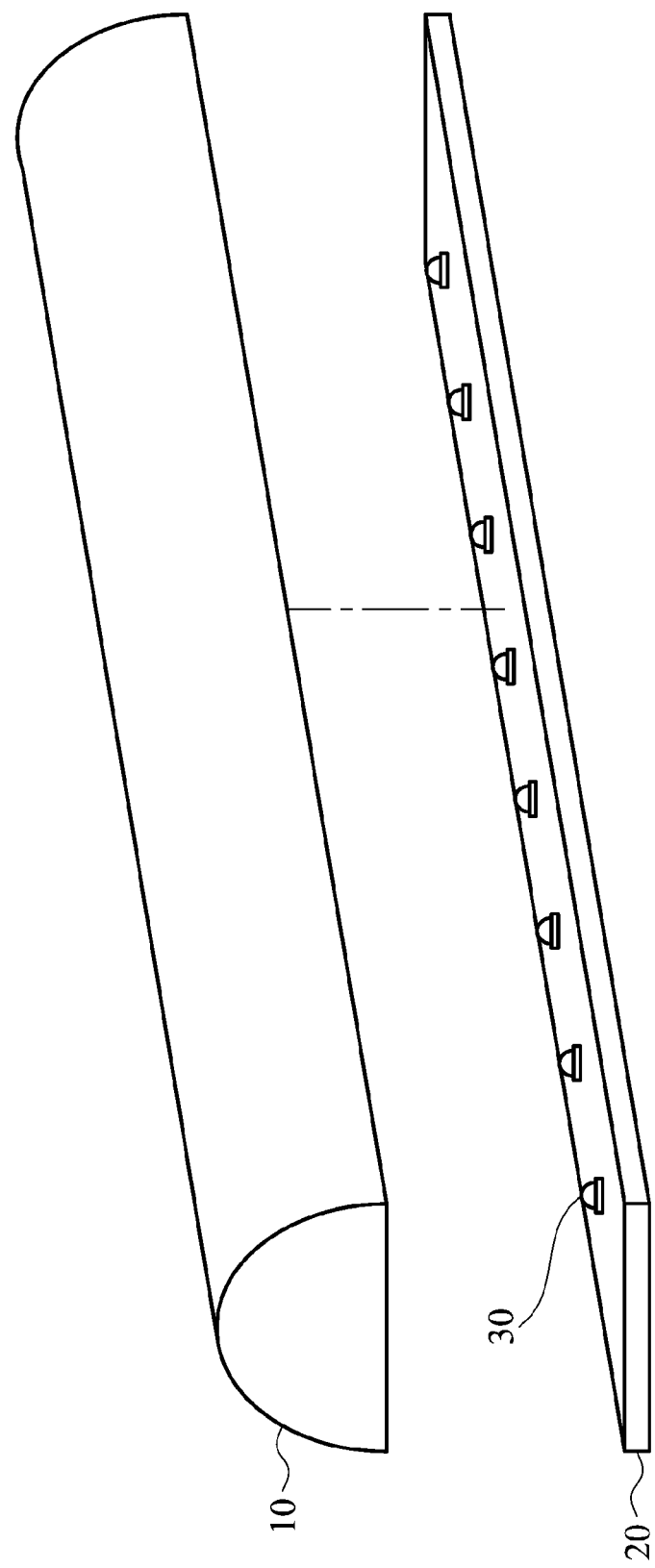
FIG. 13 depicts a tubular LED illuminant module formed by a high power LED.

FIG. 13 a tubular LED illuminant module formed by a high power LED. The optical film 10 is curved, which creates an annular emitting effect, which can serve as a tubular light source.

Figure 14:
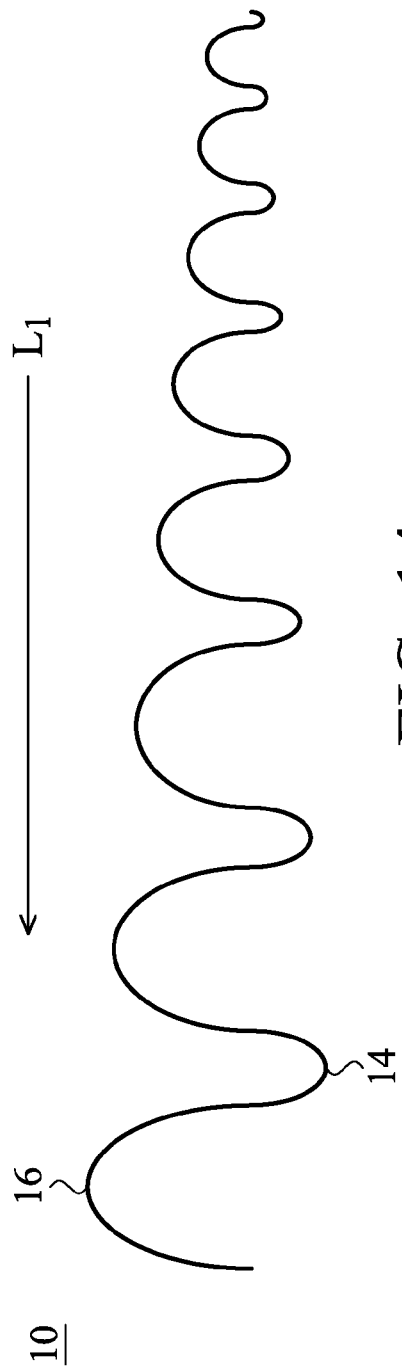
FIG. 14 depicts arrangements of the concave and the convex surfaces according to embodiments of the invention.

FIG. 14 shows an embodiment of the optical film in which the width of the concave surface 14 and the width of the convex surface 16 width are gradually larger along at least one direction L1. Furthermore, in the depicted embodiment, the concave surface has a maximum depth perpendicular to the at least one direction, and the convex surface has a maximum height perpendicular to the at least one direction, and the maximum depth and the maximum height gradual increase along the at least one direction.

Figure 15:
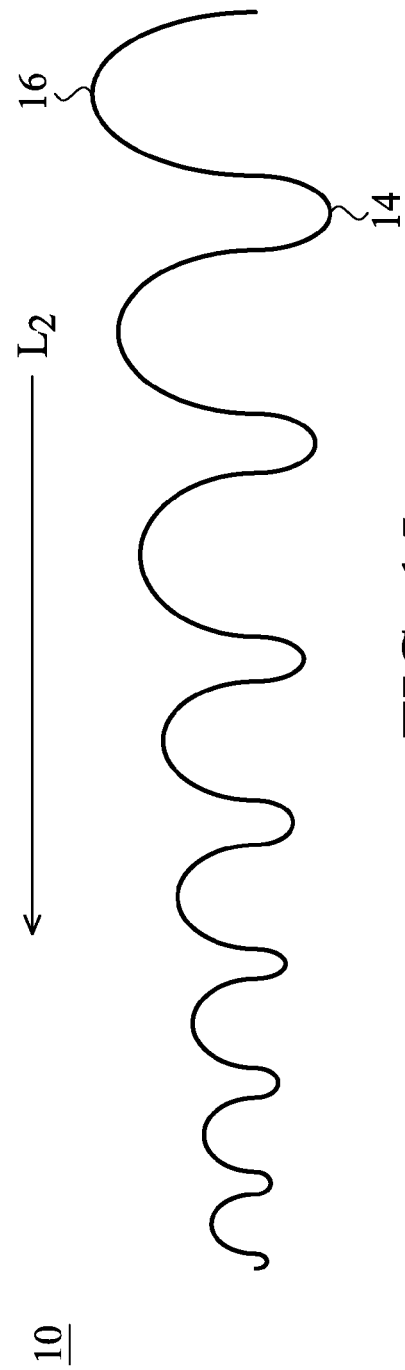
FIG. 15 depicts arrangements of the concave and the convex surfaces according to other embodiments of the invention.

FIG. 15 shows an embodiment of the optical film in which the concave 14 surface has a maximum depth perpendicular to at least one direction L2, and the convex surface 16 has a maximum height perpendicular to the at least one direction, and the maximum depth and the maximum height gradually decrease along the at least one direction.

Figure 16:
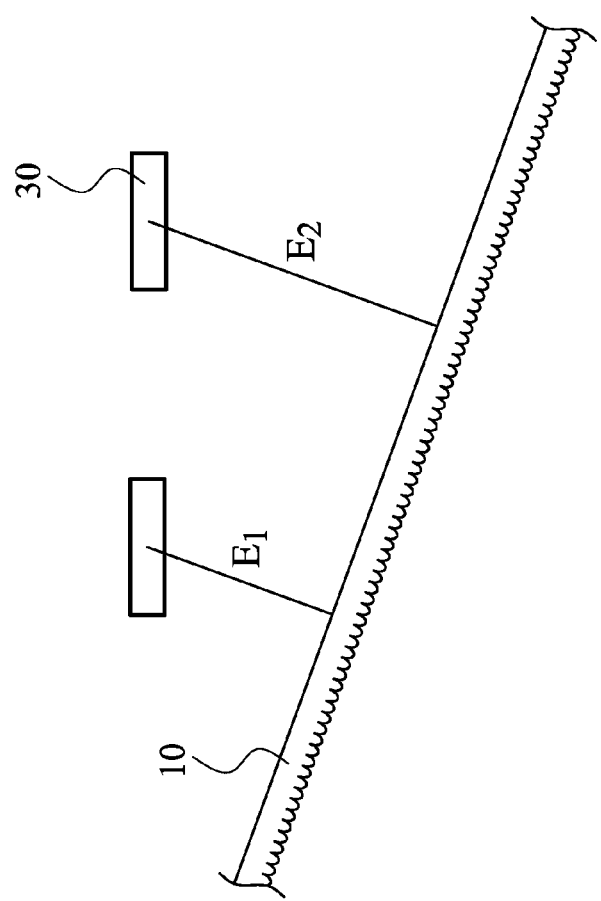
FIG. 16 depicts an embodiment of the invention in which the distance of each light emitting diode to the optical film is not equal.

FIG. 16 shows an embodiment of the invention in which the distance of each light emitting diode 30 to the optical film 10 is not equal. In particular, the distances E1, and E2 from the light emitting diodes 10 to the optical film 30 are not equal.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

TABLE 1

| No. | Distance from light source | Enlargement ratio | WD (mm) | LED + FD | LED + GD | LED + Diffusion plate |
|---|---|---|---|---|---|---|
| I | 3 | 9 x 9 | 67 | | | |
| II | 8.5 | 20 x 20 | 330 | | | |
| III | 13 | 27 x 27 | 602 | | | |
| IV | 18 | 35 x 35 | 1012 | | | |

TABLE 2

| Sample | μW | Percentage(%) |
|---|---|---|
| LED | 1523/1570 (1546) | 100 |
| LED + FD | 1374/1378 | 89.0 |
| LED + GD | 1405/1401 | 90.7 |
| LED + DP | 1162 | 75.1 |

TABLE 3

| Type | LED gap | Distance from the LED to the optical film | Space ratio |
|---|---|---|---|
| I | 3 mm | 15 mm | 5 |
| II | 5 mm | 11 mm | 2.2 |
| III | 8 mm | 8 mm | 1 |

TABLE 4

| Type | Space ratio | Brightness gain |
|---|---|---|
| I | 5 | 1.5 |
| II | 2.2 | 1.27 |
| III | 1 | 2 |

What is claimed is:

1. An illuminant module, comprising:
an optical film comprising a micro lens array comprising plurality of continuously curved concave surfaces and a plurality of continuously curved convex surfaces alternatively discontinuously conjunctionally arranged along at least a first direction and a second direction perpendicular to the first direction, wherein each of the concave surfaces has a concave surface width along the first direction, and each of the convex surfaces has a convex surface width along the first direction; and
a light source array comprising a plurality of light emitting diodes, wherein the concave surface width is not equal to the convex surface width, and the light from the light source array penetrates the optical film;

wherein the micro lens array is arranged on the opposite side of the optical film as the light source array;

wherein the concave surfaces and the convex surfaces are alternatively and conjunctionally arranged along the first direction, the second direction, and a third direction between the first and the second direction, wherein a profile of a cross-section of the micro lens array along the first direction is the same as a profile of a cross-section of the micro lens along the second direction.

2. The illuminant module as claimed in claim 1, wherein the concave surface has a maximum depth perpendicular to the first direction, and the convex surface has a maximum height perpendicular to the first direction, and the maximum depth is larger than ½ the concave surface width, and the height is larger than ½ the convex surface width.

3. The illuminant module as claimed in claim 1, wherein the concave surface width and the convex surface width are gradually larger along the first direction.

4. The illuminant module as claimed in claim 3, wherein the concave surface has a maximum depth perpendicular to the first direction, and the convex surface has a maximum height perpendicular to the first direction, and the maximum depth and the maximum height gradual increase along the first direction.

5. The illuminant module as claimed in claim 3, wherein the concave surface has a maximum depth perpendicular to the first direction, and the convex surface has a maximum height perpendicular to the first direction, and the maximum depth and the maximum height gradually decrease along the first direction.

6. The illuminant module as claimed in claim 1, wherein the concave surface width and the convex surface width decrease along the first direction.

7. The illuminant module as claimed in claim 1, wherein the concave surface has a maximum depth perpendicular to the first direction, and the convex surface has a maximum height perpendicular to the first direction, and the maximum depth and the maximum height gradually decrease along the first direction.

8. The illuminant module as claimed in claim 1, wherein the concave surface has a maximum depth perpendicular to the first direction, and the convex surface has a maximum height perpendicular to the first direction, and the maximum depth and the maximum height gradual increase along the first direction.

9. The illuminant module as claimed in claim 1, wherein the ratio of a distance from the light emitting diode to the optical film over a distance between a neighboring two of the plurality of light emitting diodes is less than 5.

10. The illuminant module as claimed in claim 1, wherein the distance of each light emitting diode to the optical film is equal.

11. The illuminant module as claimed in claim 1, wherein the distance of each light emitting diode to the optical film is not equal.

12. The illuminant module as claimed in claim 1, wherein the optical film is curved.

* * * * *